D. W. Demorest, Lightning Rod Coupling.

No. 120,251.  Patented Oct. 24, 1871.

Witnesses:
C. Raettig
Wm. H. C. Smith

Inventor:
D. W. Demorest
Per Munn & Co.
Attorneys.

UNITED STATES PATENT OFFICE.

DAVID W. DEMOREST, OF NEWARK, NEW JERSEY.

IMPROVEMENT IN LIGHTNING-ROD COUPLINGS.

Specification forming part of Letters Patent No. 120,251, dated October 24, 1871.

*To all whom it may concern:*

Be it known that I, DAVID W. DEMOREST, of Newark, in the county of Essex and State of New Jersey, have invented a new and Improved Lightning-Rod Coupling; and I do hereby declare that the following is a full, clear, and exact description thereof, which will enable others skilled in the art to make and use the same, reference being had to the accompanying drawing forming a part of this specification, in which—

Figure 1:
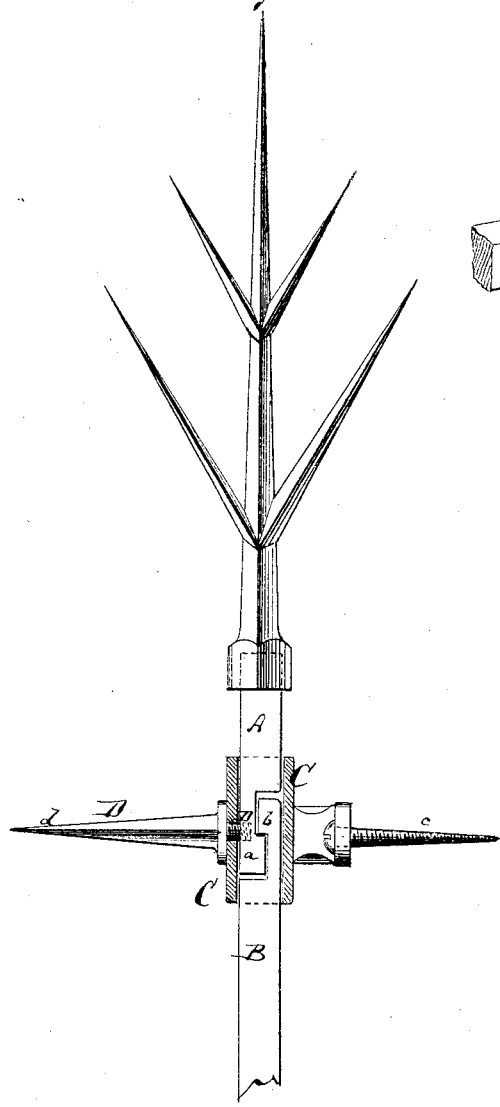
Figure 2:
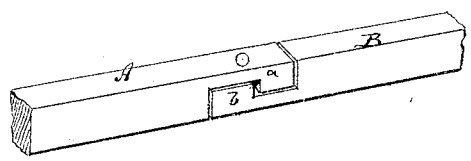
Figure 3:
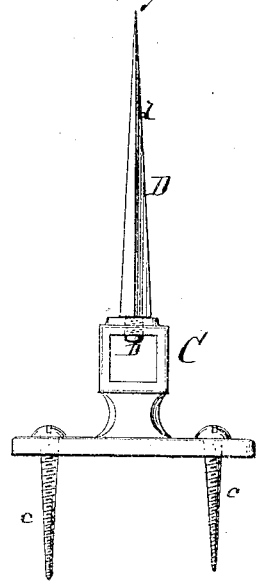

Figure 1 represents a side elevation, partly in section, of my improved lightning-rod coupling. Fig. 2 is a detail perspective view of the connected rods. Fig. 3 is a detail end view of the non-insulated bearing or coupling.

The invention consists in the arrangement of a lap-and-lock splice on the sections of rod, whereby the same are not only jointed but actually locked together. The invention consists, also, in the application of a screw to the coupling or bearing for locking one of the sections to the coupling, and thereby furnishing an absolute support.

A and B in the drawing are two adjoining sections of lightning-rod. Their adjoining ends $a$ $b$ are made hook-shaped to form a lap-and-lock splice, as is clearly shown in Fig. 2, and also in Fig. 1. This joint is formed to leave sufficient play for the expansion and contraction of the rod in hot and cold weather. C is one of the bearings or couplings of the rod. It is fastened to the wall by suitable means, screws $c$ $c$ being indicated in the drawing, and has a tubular or hollow prismatic body for receiving the ends of the sections A B, in the manner clearly shown in Fig. 1. D is a screw, fitted into the coupling C so as to enter also the section A, thereby forming an absolute connection. This screw may be provided with a pointed head, $d$, as shown, to serve as a current-breaking point. The coupling C is represented as non-insulated. It may, however, if desired, be insulated by the interposition of a solid block of glass or equivalent material between the coupling and wall, in which case the coupling should have ears for overlapping said block.

Having thus described my invention, I claim as new and desire to secure by Letters Patent—

The coupling C and screw D, combined with the locked sections A B of a lightning-rod, as specified.

The above specification of my invention signed by me this 1st day of May, 1871.

DAVID W. DEMOREST.

Witnesses:
GEO. W. MABEE,
T. B. MOSHER. (50)